(12) United States Patent
Tourrilhes et al.

(10) Patent No.: US 12,556,485 B2
(45) Date of Patent: Feb. 17, 2026

(54) FINE-GRAINED AND COARSE-GRAINED CONGESTION WINDOW SYNCHRONIZATION FOR TCP

(71) Applicant: HEWLETT PACKARD ENTERPRISE DEVELOPMENT LP, Spring, TX (US)

(72) Inventors: Jean Tourrilhes, Milpitas, CA (US); Puneet Sharma, Milpitas, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 405 days.

(21) Appl. No.: 18/161,519

(22) Filed: Jan. 30, 2023

(65) Prior Publication Data

US 2024/0259324 A1    Aug. 1, 2024

(51) Int. Cl.
| | |
|---|---|
| *G06F 15/173* | (2006.01) |
| *H04L 47/193* | (2022.01) |
| *H04L 47/27* | (2022.01) |
| *H04L 47/125* | (2022.01) |

(52) U.S. Cl.
CPC ............. *H04L 47/27* (2013.01); *H04L 47/193* (2013.01); *H04L 47/125* (2013.01)

(58) Field of Classification Search
CPC ............................ H04L 47/27; H04L 47/193
See application file for complete search history.

(56) References Cited

U.S. PATENT DOCUMENTS

| | | | | |
|---|---|---|---|---|
| 8,948,009 | B1* | 2/2015 | Hasan | H04L 47/193 370/231 |
| 2013/0041934 | A1* | 2/2013 | Annamalaisami | H04L 43/04 709/203 |
| 2018/0198890 | A1* | 7/2018 | Dhanabalan | H04L 47/193 |
| 2019/0379610 | A1* | 12/2019 | Srinivasan | H04L 47/627 |

* cited by examiner

*Primary Examiner* — Duyen M Doan
(74) *Attorney, Agent, or Firm* — Sheppard Mullin Richter & Hampton LLP

(57) ABSTRACT

Systems and methods are provided for improved TCP congestion control designed to address "mixed coarse-grained-fine-grained signal" scenarios. A TCP sender of the present technology achieves this improvement by leveraging two TCP congestion windows for a TCP connection: (1) a "fine-grained TCP signal-dependent congestion window" which is adjusted in response to "fine-grained" TCP congestion signals (as intelligently classified/defined by the present technology); and (2) a "coarse-grained TCP signal-dependent congestion window" which is adjusted in response to "coarse-grained" TCP congestion signals (as intelligently classified/defined by the present technology). With these two novel/unique congestion windows at disposal, the TCP sender can then dynamically (and intelligently) select an appropriate congestion window for dictating packet transmission for a TCP connection (e.g., the contemporaneously smaller congestion window). The TCP sender can also dynamically (and intelligently) synchronize the two congestion windows in order to ensure smoother transitions between utilized congestion windows.

14 Claims, 7 Drawing Sheets

FINE-GRAINED AND COARSE-GRAINED CONGESTION WINDOW SYNCHRONIZATION FOR TCP

BACKGROUND

Transmission Control Protocol (TCP) congestion control attempts to determine an optimal rate for sending network traffic over a TCP connection by balancing throughput (i.e., the rate of data delivery) and congestion (i.e., reduced service quality that occurs when a network path is carrying more data than it can handle). Such a determination typically requires monitoring network congestion using inferential signals (e.g., packet loss and packet delay) or explicit TCP congestion signals (e.g., Explicit Congestion Notifications (ECNs)). Accordingly, in response to these "TCP congestion signals," TCP congestion control attempts to balance throughput and congestion for a TCP connection/network path.

TCP congestion control can reduce congestion by reducing TCP congestion window size (as used herein a TCP congestion window may refer to a number of unacknowledged packets that can be outstanding/in transit end-to-end). However, reducing TCP congestion window size also tends to reduce throughput for a TCP connection. Conversely, increasing TCP congestion window size can increase throughput, at a cost of increased congestion—potentially overflowing queues and reducing network performance. Accordingly, a goal of TCP congestion control is to achieve optimal tuning of TCP congestion window size to effectively balance throughput and congestion.

BRIEF DESCRIPTION OF THE DRAWINGS

The present disclosure, in accordance with one or more various examples, is described in detail with reference to the following figures. The figures are provided for purposes of illustration only and merely depict examples.

DETAILED DESCRIPTION

Figure 1:
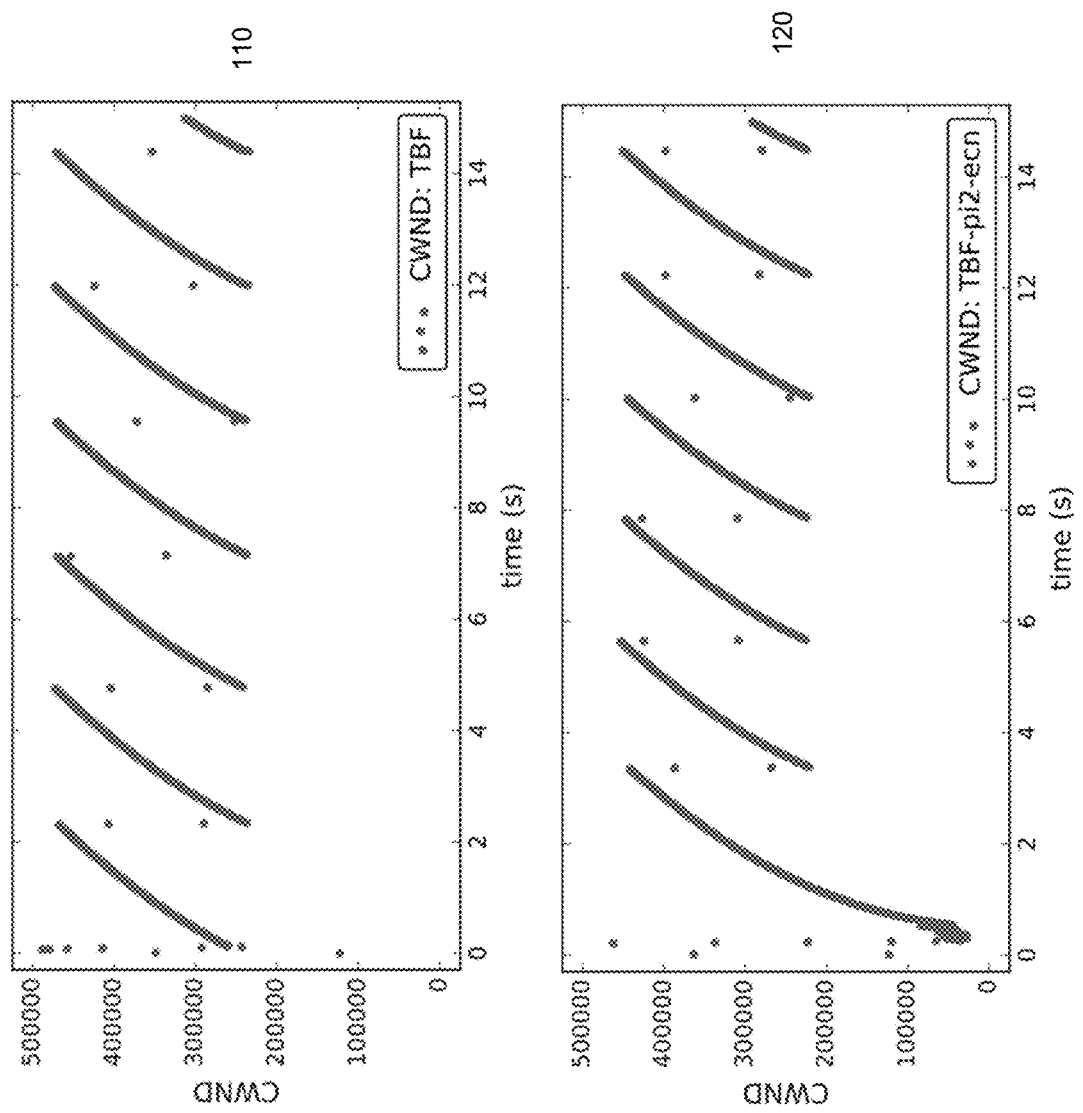
FIG. 1 depicts example graphs illustrating "coarse-grained" TCP congestion signals, in accordance with various examples of the present technology.

As alluded to above, TCP congestion control can reduce congestion by reducing TCP congestion window size. However, reducing TCP congestion window size also tends to reduce throughput. Conversely, increasing TCP congestion window size can increase throughput, at a cost of increased congestion—potentially overflowing queues and reducing network performance. Accordingly, a goal of TCP congestion control is to achieve optimal tuning of TCP congestion window size to effectively balance throughput and congestion. As alluded to above, such tuning can be implemented in response to TCP congestion signals (i.e., inferential or explicit signals indicating network congestion).

Various TCP congestion control algorithms/systems (referred to herein as TCP congestion control variants) exist today (e.g., TCP New Reno (BSD), Compound-TCP (Windows), TCP Cubic (Linux), etc.). These existing TCP congestion control variants have generally been designed under an assumption that only a single type of TCP congestion signal is received by TCP congestion control of a specific TCP connection. However, this assumption does not always hold. For example, in complex modern deployments there can be multiple congestion points (i.e., multiple bottlenecked queues) sending different types of TCP congestion signals to TCP congestion control. In these scenarios, existing TCP congestion control variants tend to perform poorly by e.g., reducing throughput too dramatically (in an attempt to reduce congestion), increasing congestion too dramatically (in an attempt to increase throughput), etc.

As examples of the present technology are designed in appreciation of, a reason that existing TCP congestion control variants perform poorly in these "mixed signal" scenarios is because different TCP congestion signals can operate at different time scales, represent different amplitudes of congestion feedback, and accordingly prescribe different magnitudes of adjustment to a TCP congestion window. In other words, existing TCP congestion control variants (which are generally designed assuming TCP congestion control receives one type of TCP congestion signal from one bottlenecked/congested queue) perform especially poorly under "mixed signal" scenarios involving both "coarse-grained" TCP congestion signals (i.e., TCP congestion signals intelligently classified/defined by the present technology as coarse-grained because they operate at relatively larger time scales, represent relatively larger amplitudes of congestion feedback, and accordingly prescribe relatively larger magnitudes of adjustment to a TCP congestion window) and "fine-grained" TCP congestion signals (i.e., TCP congestion signals intelligently classified/defined by the present technology as fine-grained because they operate at relatively smaller time scales, represent relatively smaller amplitudes of congestion feedback, and accordingly prescribe relatively smaller magnitudes of adjustment to a TCP congestion window). As examples of the present technology are designed in appreciation of, this especially poor performance in "mixed coarse grain-fine grain signal" scenarios is due in part to a tendency for the coarse-grained and fine-grained TCP congestion signals to create a feedback loop that causes significantly reduced throughput for a TCP connection. That is, the coarse-grained and fine-grained TCP congestion signals tend to prescribe clashing prescriptions—which existing TCP congestion control variants are ill-designed to resolve—resulting in especially poor performance for a TCP connection.

Against this backdrop, the present technology provides improved systems and methods for TCP congestion control designed to better manage the "mixed coarse-grained-fine-grained signal" scenarios described above. A TCP sender of the present technology achieves this improvement by leveraging two TCP congestion windows for a TCP connection: (1) a "fine-grained TCP signal-dependent congestion window" which is adjusted in response to "fine-grained" TCP congestion signals (as intelligently classified/defined by the present technology); and (2) a "coarse-grained TCP signal-dependent congestion window" which is adjusted in response to "coarse-grained" TCP congestion signals (as intelligently classified/defined by the present technology). With these two novel/unique congestion windows, the TCP sender can then dynamically (and intelligently) select an appropriate congestion window for dictating packet transmission for a TCP connection (e.g., the contemporaneously smaller congestion window). As will be described in greater detail below, the TCP sender can also dynamically (and intelligently) synchronize the two congestion windows in order to ensure smoother transitions between utilized congestion windows.

Leveraging the above-described fine-grained and coarse-grained TCP signal-dependent congestion windows, the present technology can more appropriately respond to scenarios where TCP congestion control (of a TCP connection) receives different types of TCP congestion signals from multiple bottlenecked/congested queues. This advantage is particularly acute when the different types of TCP congestion signals operate at different time scales, represent different amplitudes of congestion feedback, and accordingly prescribe different magnitudes of adjustment to a TCP congestion window. That is, the advantage provided by the present technology is particularly acute when one bottlenecked/congested queue sends "fine-grained" TCP congestion signals (as intelligently classified/defined by the present technology) and another bottlenecked/congested queue sends "coarse-grained" TCP congestion signals (as intelligently classified/defined by the present technology). As alluded to above, such scenarios are becoming more common in modern, complex network deployments. Accordingly, the present technology can provide significant advantages over existing TCP congestion control variants which are not designed in appreciation of these "mixed coarse-grained-fine-grained signal" scenarios—and the TCP congestion control-related problems they can create if not properly managed. Moreover (and as will be described in greater detail below), the present technology can be combined with most existing TCP congestion control variants (e.g., TCP New Reno, TCP Cubic, DataCenter TCP (DCTCP), etc.) and is easy to implement and analyze using existing TCP technologies/infrastructure.

Figure 2:
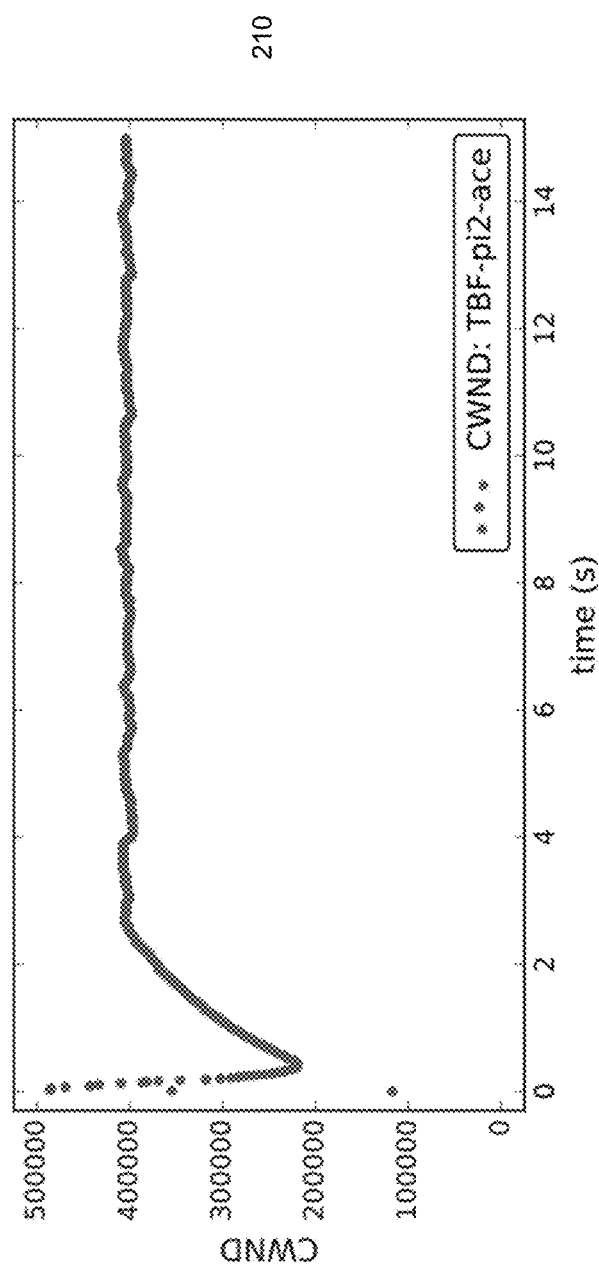
FIG. 2 depicts an example graph illustrating "fine-grained" TCP congestion signals, in accordance with various examples of the present technology.

Before describing examples of the present technology in greater detail, it can be instructive to illustrate (1) examples of "coarse-grained" and "fine-grained" TCP congestion signals as intelligently defined/classified by the present technology (see e.g., FIG. 1 and FIG. 2 respectively); (2) a generic example of TCP congestion control implemented over a network (see e.g., FIG. 3); and (3) an example "mixed coarse-grained-fine-grained signal" scenario—and the problems it can raise for TCP congestion control if not appropriately addressed (i.e., if addressed by existing TCP congestion control variants which lack the insights of the present technology). Such a scenario is described in conjunction with FIG. 4.

FIG. 1 depicts example graphs 110 and 120 illustrating "coarse-grained" TCP congestion signals, in accordance with various examples of the present technology. As a companion to FIG. 1, FIG. 2 depicts an example graph 210 illustrating "fine-grained" TCP congestion signals, in accordance with various examples of the present technology.

As can be seen by comparing FIGS. 1 and 2, "coarse-grained" TCP congestion signals (as intelligently classified/defined by the present technology) are generally characterized by relatively lower frequencies and larger amplitudes of congestion feedback (thus the "coarse" terminology of the present technology). By contrast, "fine-grained" TCP congestion signals (as intelligently classified/defined by the present technology) are generally characterized by relatively higher frequencies and smaller amplitudes of congestion feedback (thus the "fine" terminology of the present technology).

In the specific example of FIG. 1, graph 110 depicts size of a TCP congestion window over time adjusted in response to tail-drop-related TCP congestion signals. In the absence of TCP congestion signals, the congestion window increases over time until a TCP congestion signal is received (i.e., when an associated queue drops a packet)—and the TCP congestion window is again reduced. Graph 120 depicts size of a TCP congestion window over time adjusted in response to AQM/ECN-related TCP congestion signals. In the absence of TCP congestion signals, the congestion window increases over time until a TCP congestion signal is received (i.e., when an associated queue changes the ECN field of a packet)—and the TCP congestion window is again reduced. As alluded to above, the present technology would generally classify/define the TCP congestion signals (indirectly) illustrated in FIG. 1 as coarse-grained due to their relatively low frequencies and large amplitudes of congestion feedback—and accordingly the relatively larger magnitudes of TCP congestion window reduction they prescribe.

In the specific example of FIG. 2, graph 210 depicts size of a TCP congestion window over time adjusted in response to L4S-related TCP congestion signals. As alluded to above, the present technology would generally classify/define the TCP congestion signals (indirectly) illustrated in FIG. 2 as fine-grained due to their relatively high frequencies and small amplitudes of congestion feedback—and accordingly the relatively smaller magnitudes of TCP congestion window reduction they prescribe.

Figure 3:
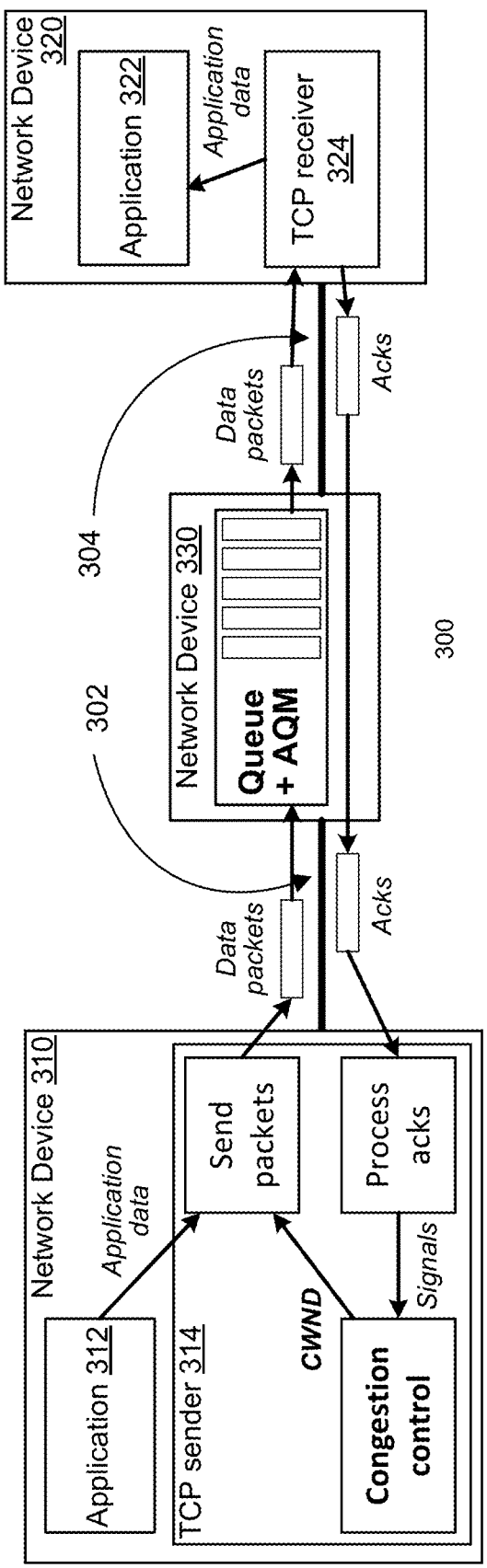
FIG. 3 depict a generic example of TCP congestion control for a TCP connection, in accordance with various examples of the present technology.

FIG. 3 depict a generic example of TCP congestion control for a TCP connection 300, in accordance with various examples of the present technology.

As depicted, an application 312 running on network device 310 wants to send application data to an application 322 running on network device 320. Accordingly, a TCP sender 314 implemented on network device 310 transmits the application data in the form of data packets over a network link 302 (here network link 302 may be associated with TCP connection 300). As depicted, a queue implemented on network device 330 receives the data packets and forwards them over a network link 304 (here network link 304 may also be associated with TCP connection 300). A TCP receiver 324 implemented on a network device 320 sends acknowledgement packets back to TCP sender 314 based on the data packets it receives from TCP sender 314.

As alluded to above, the queue (implemented on network device 330) may become congested if it receives more data packets than can be sent over network link 304. In this case, the queue may generate TCP congestion signals, by e.g., dropping packets, changing the ECN field in packet headers, etc. These TCP congestion signals may be reflected/transmitted in the acknowledgement packets received by TCP sender 314. As alluded to above (and as will be described below), TCP sender 314 can monitor TCP congestion signals reflected/transmitted in acknowledgement packets—and adjust the size of a TCP congestion window in response to such TCP congestion signals. Accordingly, TCP sender 314 may then transmit data packets for TCP connection 300 (over network link 302) in accordance with the TCP congestion window (as the TCP congestion window is adjusted in response to receipt of TCP congestion signals). For example, if the size of the TCP congestion window is reduced in response to receipt of a TCP congestion signal, TCP sender 314 may reduce the rate of data packet transmission over network link 302.

Figure 4:
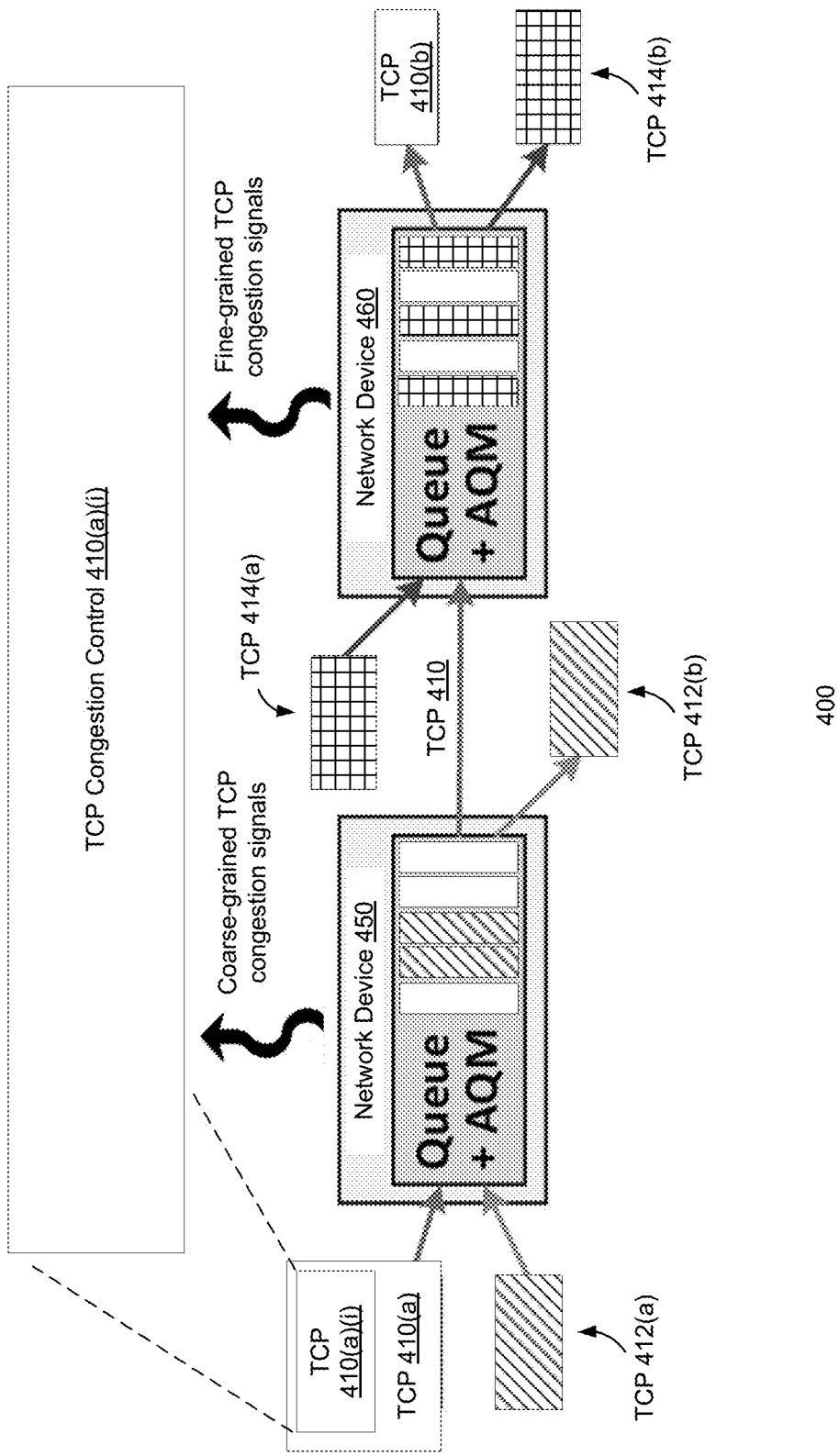
FIG. 4 illustrates an example multiple bottlenecked queue scenario, in accordance with various examples of the present technology.

As alluded to above, FIG. 4 illustrates an example multiple bottlenecked queue scenario associated with a network 400. Here a first bottlenecked queue is associated with network device 450 and a second bottlenecked queue is associated with network device 460.

FIG. 3 also depicts three TCP connections: (1) TCP connection 410 associated with a TCP sender 410(a) and a TCP receiver 410(b) (which also may be associated with network devices); (2) TCP connection 412 associated with a TCP sender 412(a) and a TCP receiver 412(b) (which also may be associated with network devices); and (3) TCP connection 414 associated with a TCP sender 414(a) and a TCP receiver 414(b) (which also may be associated with network devices). Queued data packets for TCP connection 410 are depicted as the solidly colored vertical rectangles, queued data packets for TCP connection 412 are depicted as the vertical rectangles with a striped-pattern, and queued data packets for TCP connection 414 are depicted as the vertical rectangles with a crisscrossed-pattern.

TCP sender 410(a) includes TCP congestion control 410(a)(i) for TCP connection 410. In the specific example if FIG. 4, TCP congestion control is implemented within a TCP sender (which may be implemented in a network device), but this need not be the case in other examples.

As depicted, TCP connection 410 traverses a network path with two bottlenecked queues (i.e., the queues associated with network devices 450 and 460 respectively). Accordingly, TCP congestion control 410(a)(i) associated with TCP connection 410 may receive TCP congestion signals from both bottlenecked queues.

In the illustrative example of FIG. 4, the queue associated with network device 450 sends packet loss-related TCP congestion signals. Examples of the present technology would generally classify packet loss-related TCP congestion signals as "coarse-grained" TCP congestion signals because they prescribe a relatively larger reduction to TCP congestion window size (e.g., a 50% reduction under TCP New Reno and a 30% reduction under TCP Cubic). Accordingly, the queue associated with network device 450 may be referred to as a "coarse-grained" queue.

In the illustrative example of FIG. 4, the queue associated with network device 460 is sending ECN/DCTCP-based TCP congestion signals. Examples of the present technology would generally classify these TCP congestion signals as "fine-grained" because they prescribe a relatively smaller reduction to TCP congestion window size (e.g., typically under a 10% reduction under a DCTCP-style congestion control variant).

An aim of using "fine-grained" TCP congestion signals (as intelligently classified/defined by the present technology) such as ECN/DCTCP-based TCP congestion signals is to reduce latency, which can be achieved when Active Queue Management (AQM) targets a low queuing time. In general, when targeting a low queuing time, AQM must react quickly to small increases in queuing latency so latency has less time to increase dramatically. This means that queues using fine-grained TCP congestion signals (e.g., the fine-grained queue associated with network device 460) are generally set more aggressively than queues using "coarse-grained" TCP congestion signals (e.g., the coarse-grained queue associated with network device 450). Accordingly, fine-grained queues are typically more sensitive to small variations.

Referring again to FIG. 4, assume the following: (1) the baseline Round Trip Time (RTT) of TCP connection 410's network path is 50 ms; (2) the "fine-grained" queue is configured for 5 ms queuing latency; (3) the "coarse-grained" queue has an average queuing latency of 25 ms; and (4) when both queues are bottlenecked/congested, the average RTT of TCP connection 410's network path is around 80 ms.

As alluded to above, when TCP congestion control 410(a)(i) receives a "coarse-grained" TCP congestion signal, it will reduce a TCP congestion window by a large factor, typically 50% (TCP New Reno) or 30% (TCP Cubic). This reduces the number of outstanding packets and acknowledgments on the network path by the same/similar factor (e.g., 50% or 30%). As most of the packets have already been sent, to achieve such a reduction TCP sender 410(a) must temporarily stop sending packets or dramatically reduce its sending rate.

As alluded to above, the "fine-grained" queue is configured to minimize latency, which means that outstanding packets in the queue represent a small portion of the network path RTT. Assume TCP congestion control 410(a)(i) reduces the TCP congestion window by 30% by pausing the stream of packets for 24 ms. When that pause arrives at the fine-grained queue, the fine-grained queue still has outstanding data, so for approximately 5 ms it will process its backlog. After that time, the fine-grained queue may not have packets from TCP connection 410 in the queue or incoming. Accordingly, for approximately 19 ms no packet of TCP connection 410 is sent. This starvation significantly reduces throughput for TCP connection 410.

On the other hand, for the coarse-grained queue, this congestion window reduction has a lower probability to cause starvation. This is because in the coarse queue, the queue is large and mostly full. Accordingly, such a congestion window reduction is usually shorter than the length of the queue, which prevents/reduces starvation. In the rare cases where the congestion window reduction is greater than the length of the coarse-grained queue, starvation will last a short amount of time. In this specific example, the TCP connection pause of 24 ms is smaller than the packet backlog of 25 ms, so the coarse-grained queue never stops sending packets of TCP connection 410.

After TCP congestion control 410(a)(i) has reduced the TCP congestion window, TCP sender 410(a) can resume sending packets. The new rate for sending packets may be significantly smaller than the rate prior to congestion window reduction (e.g., lower by 50% or 30%). After that, TCP sender 410(a) will try to increase sending rate gradually.

In the fine-grained queue, the AQM may adjust quickly during the congestion window reduction to prevent full queue starvation and to reach a new equilibrium (this may be achieved by allowing other TCP connections such as TCP connection 414 to increase their sending rates). In the present illustrative example, the fine-grained queue has only 5 ms of backlog in the queue, so to avoid starvation it needs to update its congestion state at least every 5 ms. During the sender pause (i.e., 19 ms), the fine-grained queue may update its congestion state at least 3 times, allowing for plenty of time to converge to a new equilibrium. When TCP sender 410(a) starts increasing sending rate, those extra packets will generally not be expected by the AQM and this can cause the fine-grained queue to grow (in some cases far)

beyond its target. Immediately, the AQM will send fine-grained TCP congestion signals aggressively to prevent queue growth.

Each of the fine-grained TCP congestion signals will cause TCP congestion control $410(a)(i)$ to reduce (by smaller magnitudes) the TCP congestion window. Such congestion window reductions will reduce sending rate/throughput. In the long term, the fine-grained queue/AQM will try to prevent TCP congestion control $410(a)$ from increasing the TCP congestion window, because such increases will disturb the fine-grained queue's new equilibrium. Accordingly, the TCP congestion window will remain close to the value after reduction or increase only very slowly. This means that the new rate for TCP connection 410 will remain close to 50% or 30% less than it was before the coarse-grained TCP congestion signal was received. This is obviously detrimental to the performance of TCP connection 410. Here, it should be understood that this issue would not arise if TCP congestion control $410(a)(i)$ only received coarse-grained TCP congestion signals. In other words, the coarse-grained queue would generally not cause this issue because the coarse-grained queue/AQM is configured to handle larger variations, with less aggressive settings.

After the above-described congestion window reduction, occupancy of the coarse-grained queue by TCP connection 410 is reduced, so TCP connection 410 uses less than its fair share of queue space on the network path. However, the coarse-grained queue may see congestion from other TCP connections (e.g., TCP connection 412), so in most cases the coarse-grained queue will still generate TCP congestion signals. When a new coarse-grained TCP congestion signal is received by TCP congestion control $410(a)$, the TCP congestion window and rate may be further reduced from their lower value. The fine-grained queue again will tend to prevent meaningful increases from this newly reduced congestion window, and the cycle can repeat.

In summary, and as alluded to above, the interaction of the fine-grained queue/signals and the coarse-grained queue/signals may create a feedback loop causing throughput for a TCP connection to be much lower than expected—negatively impacting performance for the TCP connection. This is in large part because existing TCP congestion control variants are unable to reconcile these conflicting/competing congestion TCP control signal-types.

As alluded to above (and as will be described in greater detail in conjunction with FIG. 5), the present technology improves upon these existing TCP congestion control variants by leveraging two TCP congestion windows for a TCP connection: (1) a "fine-grained TCP signal-dependent congestion window" which is adjusted in response to "fine-grained" TCP congestion signals (as intelligently classified/defined by the present technology); and (2) a "coarse-grained TCP signal-dependent congestion window" which is adjusted in response to "coarse-grained" TCP congestion signals (as intelligently classified/defined by the present technology). In this way, the present technology can reduce interactions between fine-grained and coarse-grained queues/TCP congestion signals—and the negative impacts such interactions cause. Such interaction reductions are achieved by separating the fine-grained and coarse-grained control loops using the two novel/unique congestion windows (i.e., the fine-grained TCP signal-dependent congestion window and the coarse-grained TCP signal-dependent congestion window). With these two novel/unique congestion windows at disposal, a TCP sender of the present technology can then dynamically (and intelligently) select an appropriate congestion window for dictating packet transmission for the TCP connection (e.g., the contemporaneously smaller congestion window). The TCP sender can also intelligently synchronize the two congestion windows in order to ensure smoother transitions between utilized congestion windows.

Figure 5:
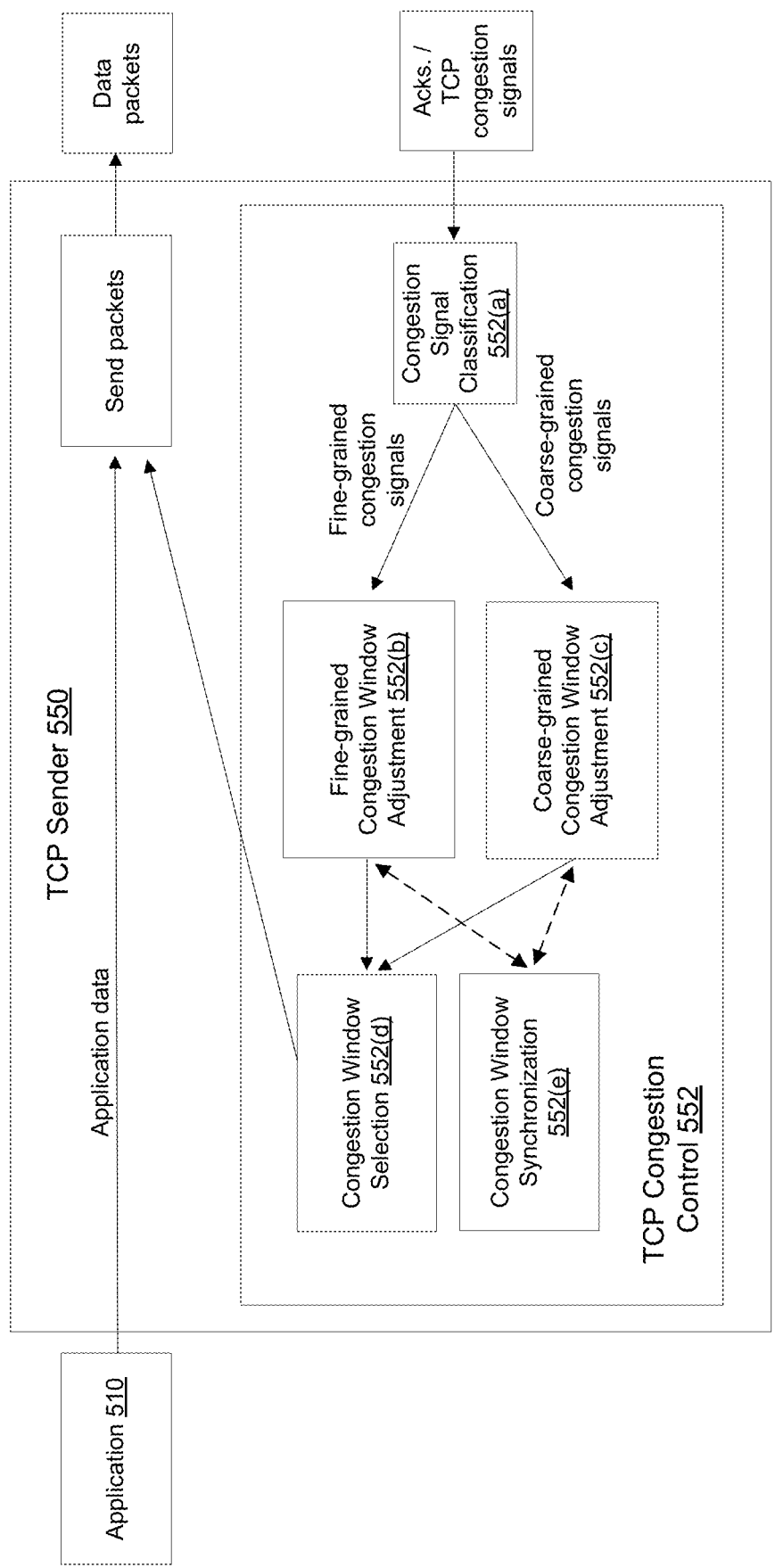
FIG. 5 illustrates an example TCP sender and example TCP congestion control, in accordance with various examples of the present technology.

FIG. 5 illustrates an example TCP sender, in accordance with various examples of the present technology.

As depicted TCP sender 550 includes a TCP congestion control module 552. TCP congestion control module 552 includes: (1) a congestion signal classification module 552$(a)$; (2) a fine-grained congestion window adjustment module 552$(b)$; (3) a coarse-grained congestion window adjustment module 552$(c)$; (4) a congestion window selection module 552$(d)$; and (5) a congestion window synchronization module 552$(e)$.

In various examples, TCP sender 550 (and its constituent modules) can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some instances, TCP sender 550 (and its constituent modules) can be, in part or in whole, implemented as software running on one or more computing devices or systems, such as on a server system, a network device, a computing system such as the computing system described in conjunction with FIG. 7, etc. In some examples, TCP sender 550 can be implemented as or within a dedicated application (e.g., app), a program, etc., running on such a computing system.

Referring again to FIG. 5, TCP sender 550 can receive application data from application 510. TCP sender 550 can send this application data, in the form of data packets, to a TCP receiver (not depicted) via a TCP connection with the TCP receiver. As depicted, TCP sender 550 can also receive acknowledgment packets from the TCP receiver acknowledging receipt of data packets transmitted via the TCP connection. Such functionality for a TCP sender/TCP connection is well understood.

Where TCP sender 550 improves upon existing technologies lies in TCP congestion control module 552. Namely, TCP congestion control module 552 improves upon existing TCP congestion control technologies by including: (1) the congestion signal classification module 552$(a)$ for classifying received TCP congestion signals as either fine-grained or coarse-grained based on magnitude of TCP congestion window size reductions prescribed by the received TCP congestion signals; (2) the fine-grained congestion window adjustment module 552$(b)$ for adjusting a fine-grained TCP signal-dependent congestion window based on the classified fine-grained TCP congestion signals; (3) the coarse-grained congestion window adjustment module 552$(c)$ for adjusting a coarse-grained TCP signal-dependent congestion window based on the classified coarse-grained TCP congestion signals; (4) the congestion window selection module 552$(d)$ for selecting one of the fine-grained TCP signal-dependent congestion window and the coarse-grained TCP signal-dependent congestion window; and (5) the congestion window synchronization module 552$(e)$ for synchronizing the two congestion windows to ensure smooth transitions between utilized congestion windows.

Each of these individual modules, and their associated functions, will now be described in greater detail below.

Congestion signal classification module 552$(a)$: Congestion signal classification module 552$(a)$ can classify received TCP congestion signals as either fine-grained or coarse-grained based on magnitude of TCP congestion window size reductions prescribed by the received TCP congestion signals.

As alluded to above, TCP congestion signals may comprise inferential or express/explicit signals indicating network congestion. Such TCP congestion signals may be inferred from, or explicitly flagged within, acknowledgement packets. For example, common (inferential) TCP congestion signals such as packet loss or packet delay can be inferred from received acknowledgment packets. As another example, Explicit Congestion Notifications (ECN) can be explicitly flagged within acknowledgement packets to provide an explicit indication of network congestion to TCP congestion control.

As alluded to above, there exist a number of different types of TCP congestion signals. Non-limiting examples include: packet loss/packet drops (used by TCP New Reno and others); packet delay (used by TCP Vegas and others); delivery rate (used by TCP Westwood and TCP Jersey); standard ECN flags compliant with classical TCP; ECN flags compliant with DCTCP or Low Latency, Low Loss, Scalable Throughput (L4S); Some Congestion Experienced (SCE) flags compliant with SCE; etc. As the present technology is designed in appreciation of, each of these types of TCP congestion signals can be classified according to the magnitude of TCP congestion window size reductions they prescribe (such differing prescriptions can be a function of the different types of TCP congestion signals operating at different time scales and representing different amplitudes of congestion feedback).

In particular, congestion signal classification module 552(*a*) can classify received TCP congestion signals prescribing relatively larger magnitudes of TCP congestion window size reductions as coarse-grained TCP congestion signals. Non-limiting examples of coarse-grained TCP congestion signals may include (depending on classification criteria): packet loss/packet drops, packet delay, standard ECN flags compliant with classical TCP, etc.

By contrast, congestion signal classification module 552(*a*) can classify received TCP congestion signals prescribing relatively smaller magnitudes of TCP congestion window size reductions as fine-grained TCP congestion signals. Non-limiting examples of fine-grained TCP congestion signals may include (depending on classification criteria): ECN flags compliant with DCTCP or L4S; SCE flags compliant with SCE; etc.

In certain examples, the dividing line between fine-grained and coarse-grained TCP congestion signals can be set at approximately 10% TCP congestion window reduction. In other words, congestion signal classification module 552(*a*) may classify TCP congestion signals that always prescribe a TCP congestion window size reduction greater than 10% as coarse-grained TCP congestion signals and TCP congestion signals that can prescribe a TCP congestion window size reduction of 10% or less as fine-grained TCP congestion signals. In other examples, congestion signal classification module 552(*a*) can use different distinctions/ dividing factors. For instance, congestion signal classification module 552(*a*) may classify TCP congestion signals that always prescribe a TCP congestion window size reduction of greater than one packet as coarse-grained TCP congestion signals and TCP congestion signals that can prescribe a TCP congestion window size reduction of one packet or less as fine-grained TCP congestion signals. In various examples, congestion signal classification module 552(*a*) can leverage machine learning (ML) or artificial intelligence (AI) to make such classifications.

As described above, by classifying received TCP congestion signals as either fine-grained or coarse-grained, TCP congestion control module 552 can adjust two different congestion windows (i.e., a fine-grained TCP signal-dependent congestion window and a coarse-grained TCP signal-dependent congestion window) in response to the respective classified TCP congestion signals. In doing this, TCP congestion control module 552 can better address the "mixed coarse-grained-fine-grained signal" scenarios that result in significant performance problems for existing TCP congestion control technologies. Namely, TCP congestion control module 552 can reduce interactions between fine-grained and coarse-grained queues/TCP congestion signals—and the negative impacts such interactions cause—by separating the fine-grained and coarse-grained control loops using two novel/unique congestion windows (i.e., the fine-grained TCP signal-dependent congestion window and the coarse-grained TCP signal-dependent congestion window).

Fine-grained congestion window adjustment module 552(*b*): TCP congestion signals classified as "fine-grained" can be routed to fine-grained congestion window adjustment module 552(*b*). In response to receiving such signals, fine-grained congestion window adjustment module 552(*b*) can adjust a fine-grained TCP signal-dependent congestion window.

As described above, a TCP congestion window may refer to a number of unacknowledged packets that can be outstanding/in transit end-to-end. In general, TCP congestion control can reduce congestion by reducing TCP congestion window size. However, reducing TCP congestion window size also tends to reduce throughput for a TCP connection. Conversely, increasing TCP congestion window size can increase throughput, at a cost of increased congestion— potentially overflowing queues and reducing network performance. Accordingly, a goal of TCP congestion control is to achieve optimal tuning of TCP congestion window size to effectively balance throughput and congestion.

As alluded to above, TCP congestion signals classified/ defined by the present technology as "fine-grained" tend to prescribe smaller (and in many cases more frequent) reductions to a TCP congestion window. It is in part for this reason that the present technology uses the "fine" terminology.

Here, it may be noted that fine-grained congestion window adjustment module 552(*b*) can utilize normal/standard rules to adjust the fine-grained TCP signal-dependent congestion window. For example, fine-grained congestion window adjustment module 552(*b*) can utilize DCTCP rules. In this way, the present technology can be easily implemented/ combined with existing TCP congestion control variants (e.g., DCTCP congestion control variants)—making the present technology highly compatible with existing TCP technologies, existing TCP infrastructure, etc. This is another benefit of the present technology.

Coarse-grained congestion window adjustment module 552(*c*): TCP congestion signals classified as "coarse-grained" can be routed to coarse-grained congestion window adjustment module 552(*c*). In response to receiving such signals, coarse-grained congestion window adjustment module 552(*b*) can adjust a coarse-grained TCP signal-dependent congestion window. As alluded to above, TCP congestion signals classified/defined by the present technology as "coarse-grained" tend to prescribe larger (and in many cases relatively less frequent) reductions to a TCP congestion window. It is in part for this reason that the present technology uses the "coarse" terminology.

Again, it may be noted that coarse-grained congestion window adjustment module 552(c) can utilize normal/standard rules to adjust the coarse-grained TCP signal-dependent congestion window. For example, coarse-grained congestion window adjustment module 552(c) can use TCP Cubic or TCP Reno rules. In this way, the present technology can be easily implemented/combined with existing TCP congestion control variants (e.g., TCP Cubic or TCP Reno and their variants)—making the present technology highly compatible with existing TCP technologies, existing TCP infrastructure, etc. This is another benefit of the present technology.

It should also be understood that the present technology can rely on just two congestion windows regardless of the number of bottlenecked queues traversed by a TCP connection. For example, if two bottlenecked queues are sending coarse-grained TCP congestion signals and one bottlenecked queue is sending fine-grained TCP congestion signals, coarse-grained congestion window adjustment module 552 (c) can adjust the coarse-grained TCP signal-dependent congestion window in response to the coarse-grained TCP congestion signals (from the two "coarse-grained" queues) and fine-grained congestion window adjustment module 552(b) can adjust the fine-grained TCP signal-dependent congestion window in response to the fine-grained TCP congestion signals (from the one "fine-grained" queue). Conversely, if only two bottlenecked queues are sending TCP congestion signals—both of which being coarse-grained—only the coarse-grained TCP signal-dependent congestion window will be adjusted.

Congestion window selection module 552(d): Congestion window selection module 552(d) can monitor the fine-grained TCP signal-dependent congestion window and the coarse-grained TCP signal-dependent congestion window and dynamically select one of the congestion windows for dictating packet transmission for TCP sender 550. In many cases, congestion window selection module 552(d) will select the contemporaneously smaller congestion window. This may be the case to err on the side of reducing congestion over increasing throughput. However, in various scenarios congestion window selection module 552(d) can use different factors in selecting the appropriate congestion window for dictating packet transmission for TCP sender 550.

As depicted, TCP sender can transmit packets according to the congestion window selected by congestion window selection module 552(d). As alluded to above, this selection may change as the sizes of the congestion windows change with respect to each other. As examples of the present technology are designed in appreciation of, such switching of congestion windows can be improved/smoothed out by intelligently synchronizing the two congestion windows. Congestion window synchronization module 552(e) performs such a synchronization.

Congestion window synchronization module 552(e): Congestion window synchronization module 552(e) synchronizes the fine-grained TCP signal-dependent congestion window and the coarse-grained TCP signal-dependent congestion window to ensure a smooth transition when congestion window selection module 552(d) selects a different congestion window for dictating packet transmission for TCP sender 550. Such synchronization, as well as its value/utility will be described in greater detail below.

To illustrate the value/utility of synchronizing the two congestion windows, assume a network path with two alternating bottlenecks associated with a "coarse-grained" queue and a "fine-grained" queue. As described above, TCP congestion control module 552 can adjust the coarse-grained TCP signal-dependent congestion window and the fine-grained TCP signal-dependent congestion window respectively in response to TCP congestion signals received from these two queues/bottlenecks.

Here, assume the "coarse-grained" queue experiences congestion first. It will send periodic coarse-grained TCP congestion signals that will reduce the coarse-grained TCP signal-dependent congestion window appropriately for the level of congestion at the "coarse-grained" queue. Meanwhile, the "fine-grained" queue may not be congested, and thus may not send congestion signals (or may send them at a very lower rate). Consequently, the fine-grained TCP signal-dependent congestion window will continue to grow. Over time, the fine-grained TCP signal-dependent congestion window may grow to a very large size, orders of magnitude larger than what would be appropriate for a network path even without congestion.

Now, the bottleneck may switch to the "fine-grained" queue—and the "fine-grained" queue may start sending fine-grained TCP congestion signals. While TCP congestion control module 552 can reduce the fine-grained TCP signal-dependent congestion window in size in response to these fine-grained TCP congestion signals—a problem arises if the fine-grained TCP signal-dependent congestion window has grown so large that a large number of fine-grained TCP congestion signals are required to reduce the fine-grained TCP signal-dependent congestion window to an appropriate size for the increased level of congestion now experienced at the fine-grained" queue. Meanwhile, the "coarse-grained" queue—which is no longer a bottleneck/no longer experiencing congestion—may stop sending TCP congestion signals (or may send them at a very low rate). As a result, the coarse-grained TCP signal-dependent congestion window will start to grow. However, if the fine-grained TCP signal-dependent congestion window has grown unchecked during the period of congestion at the "coarse-grained" queue, the coarse-grained TCP signal-dependent congestion window may still be the contemporaneously smaller congestion window despite the fact that the "fine-grained" queue—and not the "coarse-grained" queue—is currently experiencing congestion. Accordingly, the "coarse-grained" queue—which is contemporaneously smaller but growing—may remain selected as the congestion window dictating packet transmission for TCP sender 550. However, because the selected/"coarse-grained" queue is growing, TCP sender 550 may start to increase sending rate—overwhelming the (now congested) "fine-grained" queue. This can result in significant congestion at the "fine-grained" queue
causing poor network performance.

In summary, without limiting the growth of the contemporaneously larger congestion window (which in many cases will occur during periods of relatively low congestion for the queue type corresponding to the contemporaneously larger congestion window)—TCP congestion control module 552 may take too long to reduce the contemporaneously larger congestion window in size when queue(s) of that congestion window's type begin to experience congestion. This can negatively impact the transition from one congestion window to another for the purposes of dictating packet transmission. Such poor transitions can cause TCP sender 550 to increase sending rate inappropriately—overwhelming queues and/or violating fairness.

As alluded to above, the present technology addresses the above-described scenario by synchronizing the two congestion windows so neither congestion window grows too large during a period of relatively low congestion. This will often involve reducing the contemporaneously larger congestion window in size in accordance with sizing of the contemporaneously smaller congestion window. Such synchronization allows TCP sender 550 to smoothly transition from one congestion window dictating packet transmission to the other congestion window dictating packet transmission without overwhelming queues and/or violating fairness during the transition.

As the present technology is designed in appreciation of, there are two important considerations when synchronizing congestion windows: (1) timing (e.g., how often/when to synchronize); and (2) sizing (e.g., what size should a synchronized congestion window be reduced to/by what magnitude should the synchronized congestion window be reduced).

Timing: Synchronization timing can be an important consideration for congestion window synchronization module 552(*e*). If congestion window synchronization module 552(*e*) were to synchronize the congestion windows constantly, the above-described benefits of having two congestion windows adjusted in response to two different types of TCP congestion signals would be greatly reduced. However, if congestion window synchronization module 552(*e*) synchronizes the congestion windows too infrequently, one congestion window may balloon in size during a period of relatively low congestion—resulting in the above-described transition problems. Accordingly, determining appropriate timing/frequency of synchronization can greatly improve performance of TCP congestion control module 552.

In various examples, congestion window synchronization module 552(*e*) can synchronize the two congestion windows upon receipt/classification of coarse-grained TCP congestion signals (as alluded to above, and as will be described in greater detail below, such synchronization may comprise reducing a contemporaneously larger congestion window in size). Synchronizing the two congestion windows upon receipt/classification of coarse-grained TCP congestion signals offers strategic benefits. For example, the rate that coarse-grained TCP congestion signals are received/classified matches the fastest rate the coarse-grained control loop can operate (i.e., the rate at which the coarse-grained signal-dependent congestion window can be adjusted)—allowing for faster transitions. Also, the point in time of receipt/classification of a coarse-grained TCP congestion signal is the point in time at which TCP sender 550 has the best knowledge of congestion level of the coarse-grained queues, so the synchronization can be more accurate. This, in turn can allow for more aggressive synchronizations, leading to faster transitions.

In certain examples, congestion window synchronization module 552(*e*) can synchronize the two congestion windows upon receipt/classification of each coarse-grained TCP congestion signal that TCP congestion control module 552 receives/classifies. However, in other examples congestion window synchronization module 552(*e*) can be more selective. For example, upon receipt/classification of a coarse-grained TCP congestion signal, congestion window synchronization module 552(*e*) can compare the two congestion windows, and selectively/optionally reduce the contemporaneously larger congestion window in size if the contemporaneously larger congestion window is determined to be too large (e.g., exceeds a threshold size, exceeds a threshold size difference as compared to the contemporaneously smaller congestion window, etc.). This way, if/when TCP congestion control module 552 transitions to using this congestion window for dictating packet transmission for TCP sender 550, the congestion window will not be too large, and can be reduced quickly to an appropriate size.

In other examples, congestion window synchronization module 552(*e*) can use other factors/metrics in order to determine when to synchronize the two congestion windows. For instance, congestion window synchronization module 552(*e*) can synchronize the two congestion windows after a predetermined number of packets have been sent or acknowledged since a previous synchronization. Or, in some examples congestion window synchronization module 552(*e*) can synchronize the two congestion windows at periodic predetermined time intervals (e.g., every multiple of the current RTT).

Sizing: Synchronization sizing can be another important consideration for congestion window synchronization module 552(*e*). As described above, synchronization will typically involve reducing the contemporaneously larger congestion window in size in accordance with sizing of the contemporaneously smaller congestion window.

A simple/naive way to do this would be to reduce the contemporaneously larger congestion window to the size of the contemporaneously smaller congestion window. This approach would be flawed however. For example, if the coarse-grained signal dependent-congestion window is the contemporaneously larger congestion window, this will typically correspond to a lower level of congestion for "coarse-grained" queues as compared to "fine-grained" queues. Accordingly, the coarse-grained signal dependent-congestion window should be larger than the fine-grained signal dependent-congestion window (i.e., such a difference in congestion window size would be appropriate). Further, TCP congestion signals are often sent at unpredictable intervals (i.e., they are not sent periodically). Therefore a coarse-grained TCP congestion signal could arrive quickly after synchronization and reduce the coarse-grained signal dependent-congestion window below the value of the fine-grained signal dependent-congestion window. This reduction would reduce send rate for TCP sender 550, reduce the throughput of the TCP connection, and interfere with the stability of the fine-grained control loop (i.e., adjustments of the fine-grained signal dependent-congestion window).

In summary, and as examples of the present technology are designed in appreciation of, performance for TCP congestion control module 552 can be improved by reducing the contemporaneously larger congestion window to a size that is larger than the contemporaneously smaller congestion. This type of reduction can be set/calibrated such that transition between control loops/congestion windows is quick enough while minimizing interactions between control loops.

Designed in appreciation of this insight, congestion window synchronization module 552(*e*) can achieve the above-described goals in multiple ways.

For instance, congestion window synchronization module 552(*e*) can reduce the contemporaneously larger congestion window to the size of the contemporaneously lower congestion window plus a predetermined number of packets (e.g., one or two packets). This type of reduction can reduce interactions because fine-grained TCP congestion signals are generally more frequent than coarse-grained TCP congestion signals and the two congestion windows are typically increased by the same amount when no TCP congestion signal is received. This type of reduction can also ensure that transition to the coarse-grained control loop would happen upon receipt/classification of the next coarse-grained TCP congestion signal as needed.

As another example, congestion window synchronization module 552(*e*) can reduce the contemporaneously larger congestion window to the size of the contemporaneously lower congestion window multiplied by a predetermined value greater than one.

In still further examples, where the fine-grained TCP signal-dependent congestion window is the contemporaneously larger congestion window, congestion window synchronization module 552(*e*) can reduce the fine-grained TCP signal-dependent congestion window (i.e., the contemporaneously larger congestion window in these examples) to a size in between a maximum operating size and a minimum operating size for the coarse-grained TCP signal-dependent congestion window. In some cases, this may be the approximate mid-point of the operating size for the coarse-grained TCP signal-dependent congestion window (in these examples if the fine-grained TCP signal-dependent congestion window is already smaller than the mid-point of the coarse-grained TCP signal-dependent congestion window's operating size there may be no reduction). Here, the maximum operating size for the coarse-grained TCP signal-dependent congestion window may the size of the coarse-grained TCP signal-dependent congestion window right before a coarse-grained TCP congestion signal is received/classified (i.e., right before the coarse-grained TCP signal-dependent congestion window is reduced). By contrast, the minimum operating size for the coarse-grained TCP signal-dependent congestion window may be the size of the coarse-grained TCP signal-dependent congestion window right after a coarse-grained TCP congestion signal is received/classified (i.e., right after the coarse-grained TCP signal-dependent congestion window is reduced). Understanding certain dynamics of network congestion may be instructive for appreciating the benefits of such a reduction/synchronization technique. For example, upon receipt/classification of a coarse-grained TCP congestion signal, coarse-grained congestion window adjustment module 552(*c*) can reduce the coarse-grained TCP signal-dependent congestion window by 30% or 50% depending on the TCP congestion control algorithm/variant being used (e.g., TCP Cubic vs. TCP New Reno). Either way, TCP congestion control module 552 will know the maximum and the minimum sizes for the coarse-grained TCP signal-dependent congestion window right before and right after a theoretical coarse-grained adjustment. Accordingly, congestion window synchronization module 552(*e*) can reduce the fine-grained TCP signal-dependent congestion window (when the fine-grained TCP signal-dependent congestion window is the contemporaneously larger congestion window) to the approximate mid-point of these two values. The fine-grained TCP signal-dependent congestion window tends to either be relatively stable (see e.g., FIG. 2) or rise slowly, because it usually receives frequent congestion signals. After reduction, the coarse-grained TCP signal-dependent congestion window will increase according to the rules of the TCP congestion control. If the fine-grained TCP signal-dependent congestion window is set to the approximate midpoint of these two values, it will take approximately half a RTT period for the coarse-grained TCP signal-dependent congestion window to reach that level. At this point, the fine-grained TCP signal-dependent congestion window may have increased (e.g., where there is no congestion), and no transition would occur. Alternatively, the fine-grained TCP signal-dependent congestion window may have remained relatively constant or decreased (e.g., where there is congestion), and congestion window selection module 552(*d*) will transition to using the fine-grained TCP signal-dependent congestion window.

Using the approximate midpoint of these two values can prevent erroneous/unnecessary transitions, while making sure that necessary transitions happen within a RTT timeframe.

Figure 6:
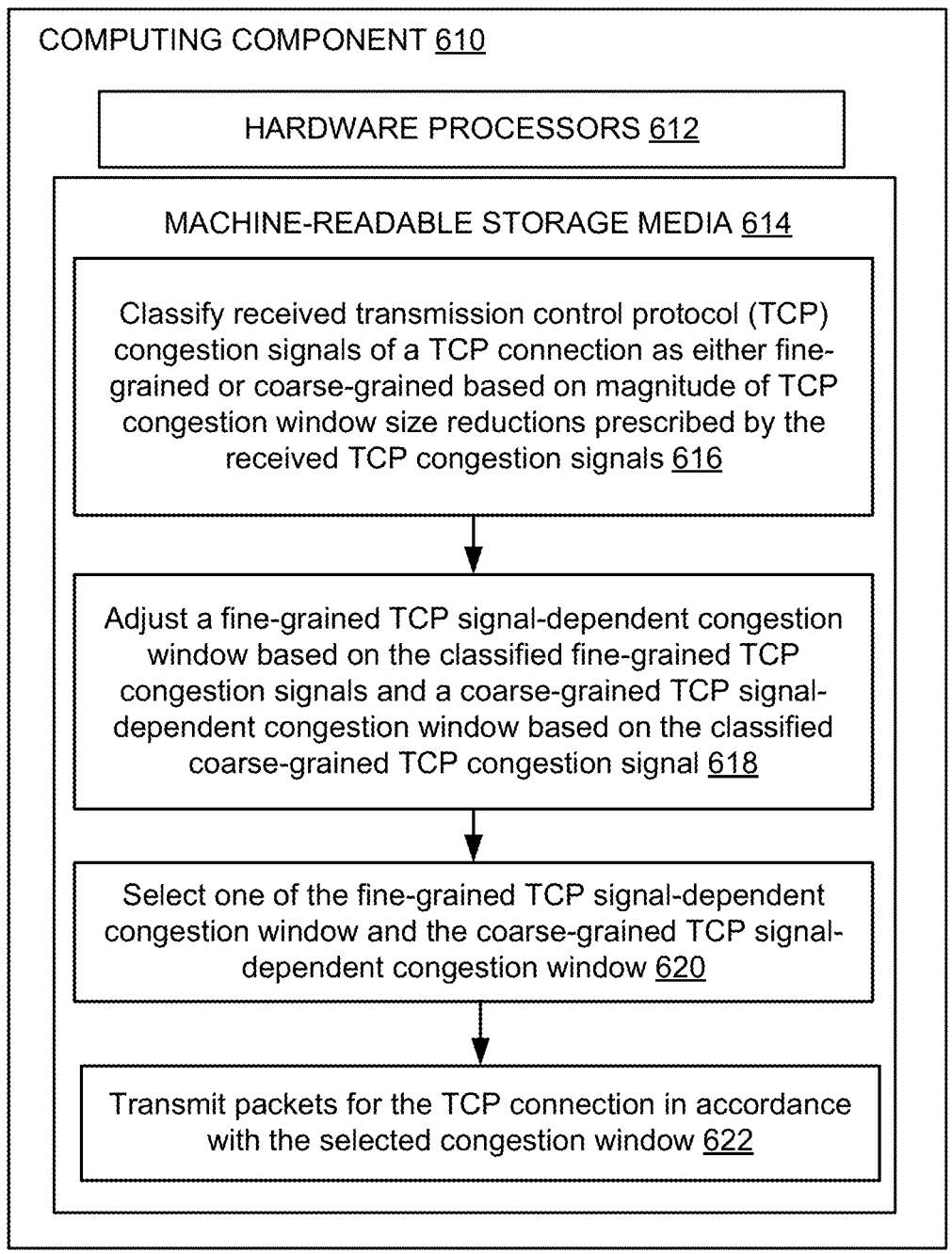
FIG. 6 depicts an example computing system that may be used for TCP congestion control, in accordance with various examples of the present technology.

FIG. 6 depicts an example computing system 600 that may be used for TCP congestion control, in accordance with various examples of the present technology.

Referring now to FIG. 6, computing component 610 may be, for example, a server computer, a controller, or any other similar computing component capable of processing data. In the example implementation of FIG. 6, the computing component 610 includes a hardware processor 612, and machine-readable storage medium for 614.

Hardware processor 612 may be one or more central processing units (CPUs), semiconductor-based microprocessors, and/or other hardware devices suitable for retrieval and execution of instructions stored in machine-readable storage medium 614. Hardware processor 612 may fetch, decode, and execute instructions, such as instructions 616-622, to control processes or operations for fine-grained signal-dependent and coarse-grained congestion signal-dependent congestion windows synchronization. As an alternative or in addition to retrieving and executing instructions, hardware processor 612 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 614, may be any electronic, magnetic, optical, or other physical storage device that contains or stores executable instructions. Thus, machine-readable storage medium 614 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 614 may be a non-transitory storage medium, where the term "non-transitory" does not encompass transitory propagating signals. As described in detail below, machine-readable storage medium 614 may be encoded with executable instructions, for example, instructions 616-622. In various examples, the instructions may be performed dynamically. In some examples, computer system 600 may be used to implement TCP sender 550 of FIG. 5, or vice versa.

As described above, computer system 600 may be used for TCP congestion control.

Accordingly, hardware processor 612 may execute instruction 616 to classify TCP congestion signals received from a TCP connection as either fine-grained or coarse-grained based on magnitude of TCP congestion window size reductions prescribed by the received TCP congestion signals. Execution of instruction 616 may be the same/similar as described in conjunction with FIG. 5 and congestion signal classification module 552(*a*).

As alluded to above, the classified fine-grained TCP congestion signals may prescribe smaller TCP congestion window size reductions than the classified coarse-grained TCP congestion window signals. In certain examples, the classified fine-grained TCP congestion signals may be TCP congestion signals that can prescribe a TCP congestion window size reduction of 10% or less. In these examples, the classified coarse-grained TCP congestion signals may be TCP congestion signals that always prescribe a TCP congestion window size reduction of greater than 10% or no TCP congestion window size reduction. In other examples, the classified fine-grained TCP congestion signals may be TCP congestion signals that can prescribe TCP congestion window size reductions of one packet or less (per TCP congestion signal). In these examples, the classified coarse-grained TCP congestion signals may be TCP congestion signals that always prescribe TCP congestion window size reductions of greater than one packet (per TCP congestion signal).

Hardware processor 612 may execute instruction 618 to adjust a fine-grained TCP signal-dependent congestion window based on the classified fine-grained TCP congestion signals and a coarse-grained TCP signal-dependent congestion window based on the classified coarse-grained TCP congestion signals. Execution of instruction 618 may be the same/similar as described in conjunction with FIG. 5, fine-grained congestion window adjustment module 552(*b*), and coarse-grained congestion window adjustment module 552 (*c*).

Hardware processor 612 may execute instruction 620 to select one of the fine-grained TCP signal-dependent congestion window and the coarse-grained TCP signal-dependent congestion window. Execution of instruction 620 may be the same/similar as described in conjunction with FIG. 5 and congestion window adjustment module 552(*d*).

As described above, in certain examples, selecting one of the fine-grained TCP signal-dependent congestion window and the coarse-grained TCP signal-dependent congestion window may comprise selecting the congestion window which is contemporaneously smaller.

Hardware processor 612 may execute instruction 622 to transmit packets for the TCP connection in accordance with the selected congestion window. Execution of instruction 622 may be the same/similar as described in conjunction with FIG. 5 and TCP sender 550.

In certain examples, hardware processor 612 can also synchronize the fine-grained TCP signal-dependent congestion window and the coarse-grained TCP signal-dependent congestion window. Such synchronization may be the same/similar as described in conjunction with FIG. 5 and congestion window synchronization module 552(*e*).

As described above, synchronizing the fine-grained TCP signal-dependent congestion window and the coarse-grained TCP signal-dependent congestion window may comprise synchronizing the contemporaneously larger congestion window (i.e., either of the fine-grained TCP signal-dependent congestion window and the coarse-grained TCP signal-dependent congestion windows) with the contemporaneously smaller congestion window (i.e., the other of the fine-grained TCP signal-dependent congestion window and the coarse-grained TCP signal-dependent congestion windows). In these examples, synchronizing the contemporaneously larger congestion window with the contemporaneously smaller congestion window may comprise reducing the contemporaneously larger congestion window in size to a size larger than the contemporaneously smaller congestion window.

In some examples, reducing the contemporaneously larger congestion window in size to a size larger than the contemporaneously smaller congestion window may comprise reducing the fine-grained TCP signal-dependent congestion window to a size in between a maximum operating size and a minimum operating size for the coarse-grained TCP signal-dependent congestion window. In other examples, reducing the contemporaneously larger congestion window in size to a size larger than the contemporaneously smaller congestion window may comprise: (a) reducing the contemporaneously larger congestion window to the size of the contemporaneously smaller congestion window plus a predetermined number of packets; or (b) reducing the contemporaneously larger congestion window to the size of the contemporaneously smaller congestion window multiplied by a predetermined value greater than one.

In various examples, synchronizing the contemporaneously larger congestion window with the contemporaneously smaller congestion window may comprise synchronizing the contemporaneously larger congestion window with the contemporaneously smaller congestion window upon classification of coarse-grained TCP congestion signals. In some of these examples, hardware processor 612 can synchronize the two congestion windows upon receipt/ classification of each coarse-grained TCP congestion signal. However, in other examples hardware processor 612 can be more selective. For example, upon receipt/classification of a coarse-grained TCP congestion signal, hardware processor 612 can compare the two congestion windows, and selectively/optionally reduce the contemporaneously larger congestion window in size if the contemporaneously larger congestion window is determined to be too large (e.g., exceeds a threshold size, exceeds a threshold size difference as compared to the contemporaneously smaller congestion window, etc.).

In some examples, synchronizing the contemporaneously larger congestion window with the contemporaneously smaller congestion window may comprise synchronizing the contemporaneously larger congestion window with the contemporaneously smaller congestion window after a predetermined number of packets have been sent or acknowledged since a previous synchronization.

In other examples, synchronizing the contemporaneously larger congestion window with the contemporaneously smaller congestion window may comprise synchronizing the contemporaneously larger congestion window with the contemporaneously smaller congestion window at periodic predetermined time intervals.

Figure 7:
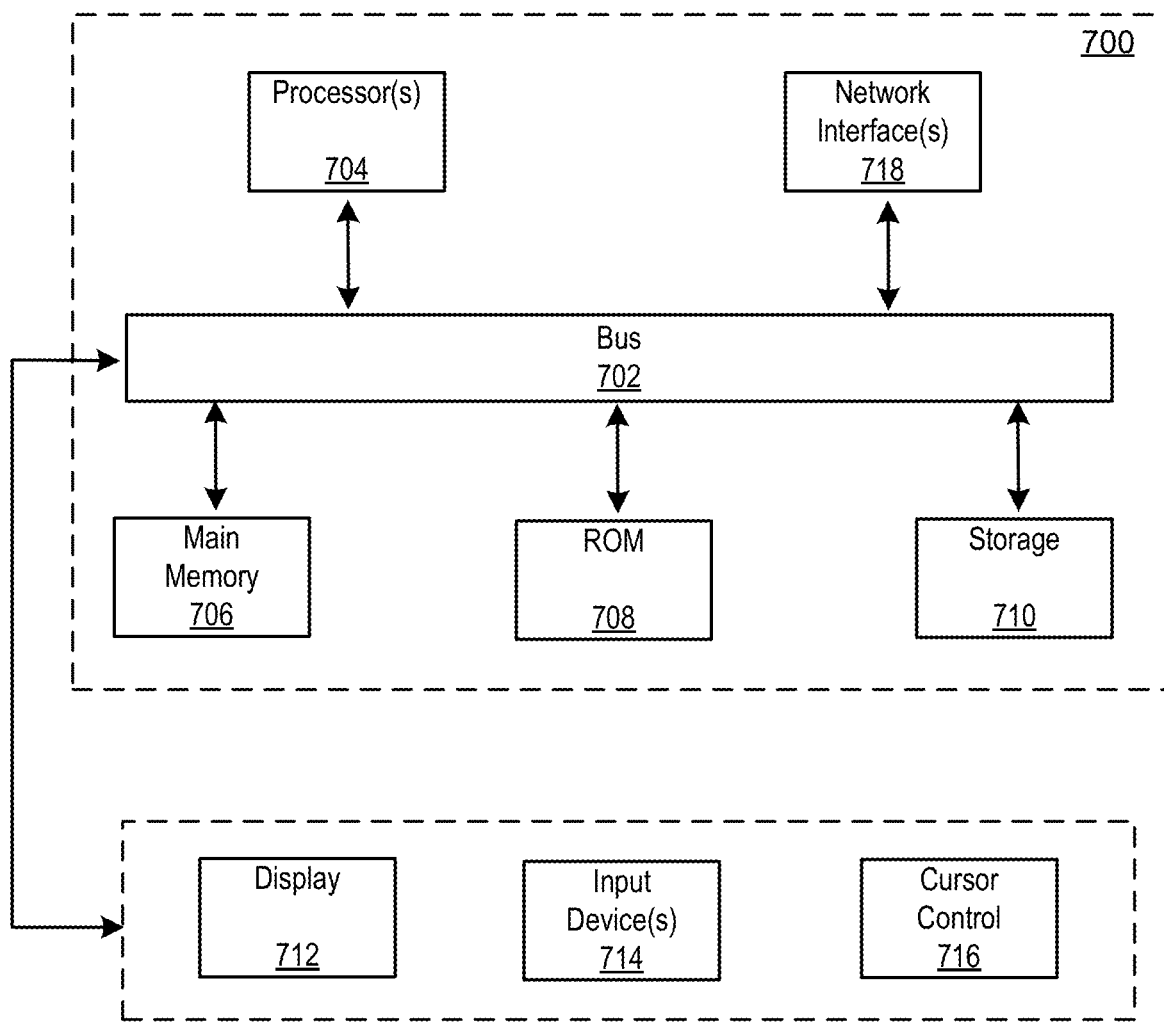
FIG. 7 depicts a block diagram of an example computer system in which various of the embodiments described herein may be implemented The figures are not exhaustive and do not limit the present disclosure to the precise form disclosed.

FIG. 7 depicts a block diagram of an example computer system 700 in which various of the examples described herein may be implemented. In various examples computer system 700 may be used to implement TCP sender 550 of FIG. 5 and/or computing system 600 of FIG. 6.

The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a liquid crystal display (LCD) (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. In some examples, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one example, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

The computer system 700 also includes a communication interface 718 coupled to bus 702. Network interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, network interface 718 may be a local area network (LAN) card to provide a data communication connection to a compatible LAN (or WAN component to communicated with a WAN). Wireless links may also be implemented. In any such implementation, network interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example examples. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 700.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computer-implemented method comprising:
    classifying received transmission control protocol (TCP) congestion signals of a TCP connection as either fine-grained or coarse-grained based on magnitude of TCP congestion window size reductions prescribed by the received TCP congestion signals;
    adjusting a fine-grained TCP signal-dependent congestion window based on the classified fine-grained TCP congestion signals and a coarse-grained TCP signal-dependent congestion window based on the classified coarse-grained TCP congestion signals;
    selecting one of the fine-grained TCP signal-dependent congestion window and the coarse-grained TCP signal-dependent congestion window, wherein selecting one of the fine-grained TCP signal-dependent congestion window and the coarse-grained TCP signal-dependent congestion window comprises:
        selecting a congestion window which is contemporaneously smaller; and
        synchronizing a contemporaneously larger congestion window with the contemporaneously smaller congestion window; and
    transmitting packets for the TCP connection in accordance with the selected congestion window.

2. The computer-implemented method of claim 1, wherein the classified fine-grained TCP congestion signals prescribe smaller TCP congestion window size reductions than the classified coarse-grained TCP congestion window signals.

3. The computer-implemented method of claim 1, wherein synchronizing the contemporaneously larger congestion window with the contemporaneously smaller congestion window comprises reducing the contemporaneously larger congestion window in size to a size larger than the contemporaneously smaller congestion window.

4. The computer-implemented method of claim 3, wherein reducing the contemporaneously larger congestion window in size to a size larger than the contemporaneously smaller congestion window comprises:
    reducing the fine-grained TCP signal-dependent congestion window to a size in between a maximum operating size and a minimum operating size for the coarse-grained TCP signal-dependent congestion window.

5. The computer-implemented method of claim 3, wherein reducing the contemporaneously larger congestion window in size to a size larger than the contemporaneously smaller congestion window comprises:
    reducing the contemporaneously larger congestion window to the size of the contemporaneously smaller congestion window plus a predetermined number of packets.

6. The computer-implemented method of claim 3, wherein reducing the contemporaneously larger congestion window in size to a size larger than the contemporaneously smaller congestion window comprises:
    reducing the contemporaneously larger congestion window to the size of the contemporaneously smaller congestion window multiplied by a predetermined value greater than one.

7. The computer-implemented method of claim 1, wherein synchronizing the contemporaneously larger congestion window with the contemporaneously smaller congestion window comprises:

synchronizing the contemporaneously larger congestion window with the contemporaneously smaller congestion window upon classification of coarse-grained TCP congestion signals.

8. The computer-implemented method of claim 1, wherein synchronizing the contemporaneously larger congestion window with the contemporaneously smaller congestion window comprises:
synchronizing the contemporaneously larger congestion window with the contemporaneously smaller congestion window after a predetermined number of packets have been sent or acknowledged since a previous synchronization.

9. The computer-implemented method of claim 1, wherein synchronizing the contemporaneously larger congestion window with the contemporaneously smaller congestion window comprises:
synchronizing the contemporaneously larger congestion window with the contemporaneously smaller congestion window at periodic predetermined time intervals.

10. A TCP congestion control system, comprising:
at least one processor, and
a memory storing instructions that, when executed by the at least one processor, cause the system to perform a method comprising:
classifying received TCP congestion signals of a TCP connection as either fine-grained or coarse-grained based on magnitude of TCP congestion window size reductions prescribed by the received TCP congestion signals, wherein the classified fine-grained TCP congestion signals prescribe smaller TCP congestion window size reductions than the classified coarse-grained TCP congestion window signals;
adjusting a fine-grained TCP signal-dependent congestion window based on the classified fine-grained TCP congestion signals and a coarse-grained TCP signal-dependent congestion window based on the classified coarse-grained TCP congestion signals;
selecting one of the fine-grained TCP signal-dependent congestion window and the coarse-grained TCP signal-dependent congestion window for dictating packet transmission for the TCP connection, wherein selecting one of the fine-grained TCP signal-dependent congestion window and the coarse-grained TCP signal-dependent congestion window comprises:
selecting a congestion window which is contemporaneously smaller; and
synchronizing a contemporaneously larger congestion window with the contemporaneously smaller congestion window.

11. The TCP congestion control system of claim 10, wherein synchronizing the contemporaneously larger congestion window with the contemporaneously smaller congestion window comprises reducing the contemporaneously larger congestion window in size to a size larger than the contemporaneously smaller congestion window.

12. The TCP congestion control system of claim 10, wherein synchronizing the contemporaneously larger congestion window with the contemporaneously smaller congestion window comprises:
synchronizing the contemporaneously larger congestion window with the contemporaneously smaller congestion window upon classification of coarse-grained TCP congestion signals.

13. A non-transitory computer-readable storage medium including instructions that, when executed by at least one processor, cause the processor to perform a method comprising:
classifying received TCP congestion signals of a TCP connection as either fine-grained or coarse-grained based on magnitude of TCP congestion window size reductions prescribed by the received TCP congestion signals;
adjusting a fine-grained TCP signal-dependent congestion window based on the classified fine-grained TCP congestion signals and a coarse-grained TCP signal-dependent congestion window based on the classified coarse-grained TCP congestion signals;
selecting one of the fine-grained TCP signal-dependent congestion window and the coarse-grained TCP signal-dependent congestion window, wherein selecting one of the fine-grained TCP signal-dependent congestion window and the coarse-grained TCP signal-dependent congestion window comprises:
selecting a congestion window which is contemporaneously smaller; and
synchronizing a contemporaneously larger congestion window with the contemporaneously smaller congestion window; and
transmitting packets for the TCP connection in accordance with the selected congestion window.

14. The non-transitory computer-readable storage medium of claim 13, wherein the classified fine-grained TCP congestion signals prescribe smaller TCP congestion window size reductions than the classified coarse-grained TCP congestion window signals.

* * * * *